Feb. 23, 1965  R. M. VAN HOUSE ETAL  3,170,536
HYDRAULIC POWER BRAKE AND POWER STEERING SYSTEM
Filed June 27, 1963  2 Sheets-Sheet 1

INVENTORS
Robert M. Van House
Charles R. Kenrick
George E. Kellogg
BY
O. O. McGraw
THEIR ATTORNEY INVENTORS
Robert M. VanHouse
Charles R. Kenrick
George E. Kellogg
BY
D.D. McGraw
THEIR ATTORNEY

United States Patent Office 3,170,536
Patented Feb. 23, 1965

3,170,536
HYDRAULIC POWER BRAKE AND POWER STEERING SYSTEM
Robert M. Van House, Dayton, Ohio, Charles R. Kenrick, Niles, Mich., and George E. Kellogg, Miamisburg, Ohio, assignors to General Motors Corporation, Detroit, Mich., a corporation of Delaware
Filed June 27, 1963, Ser. No. 291,119
5 Claims. (Cl. 180—82)

The invention relates to a hydraulic fluid power system including a power steering gear mechanism and a power brake mechanism and more particularly relates to such a system wherein the power steering gear booster control valve is connected in series with the power brake booster control mechanism with the brake booster being operable independently of power steering gear operation and being provided with a hydraulic fluid pressure accumulator for brake operation should the power steering gear malfunction so as to cut off hydraulic pressure to the brake mechanism or if for some other reason the source of hydraulic pressure should fail. The invention further relates to control features in such a system including a fluid distributor receiving hydraulic fluid pressure from a pump and distributing the pressure to the power steering gear valve and to the accumulator and to the brake mechanism under various conditions of operation in cooperation with another fluid distributor which distributes pressurized fluid to the brake mechanism either from the source of hydraulic fluid pressure or from the accumulator in order to maintain braking power for safety purposes. Another feature of the system is the provision of a bypass valve mechanism which establishes the accumulator pressure and the maximum pressure delivered to the brake booster mechanism in cooperation with the accumulator and the fluid distributors.

Figure 1:
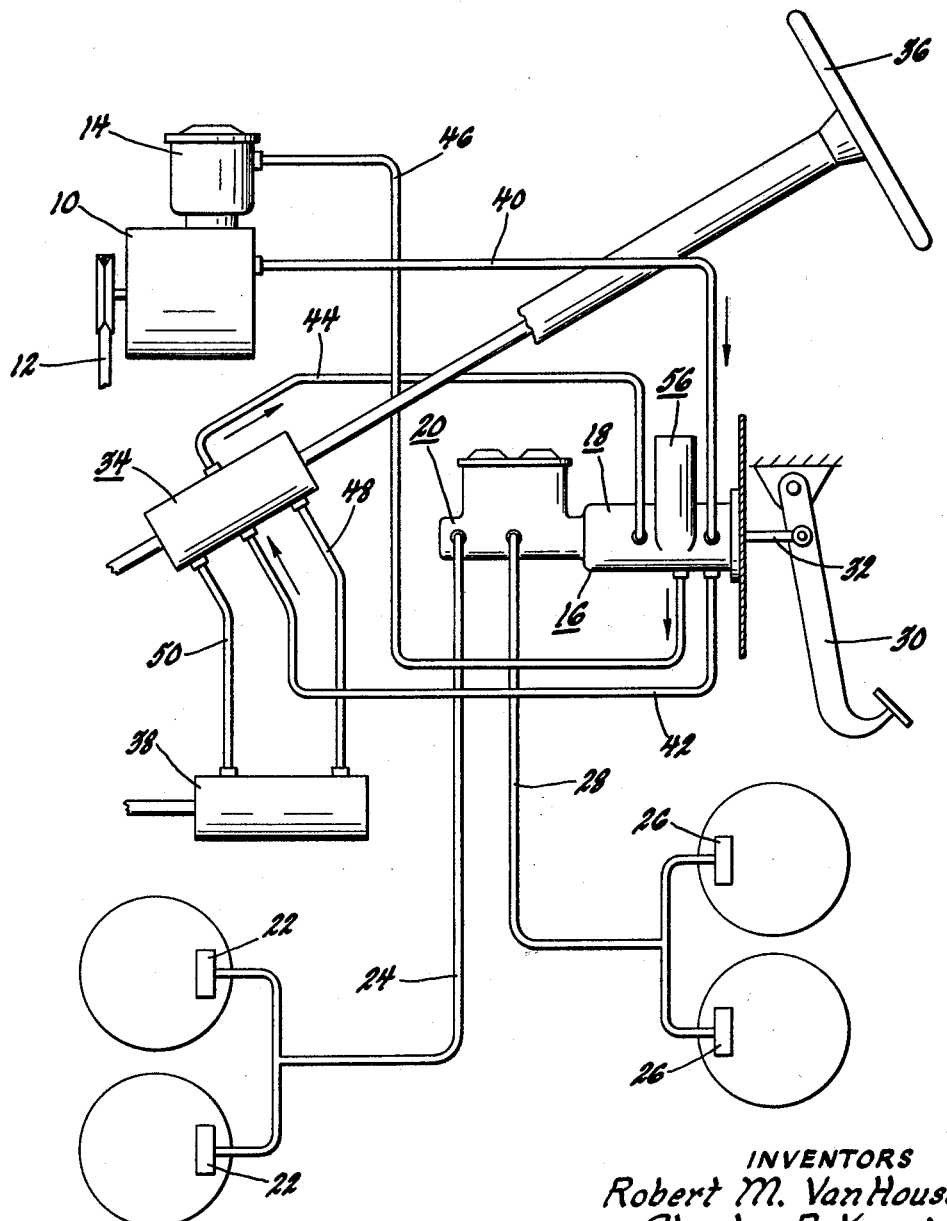
FIGURE 1 is a schematic representation of a hydraulic power booster system embodying the invention.

The system generally disclosed in FIGURE 1 includes a hydraulic fluid pressurizing pump 10 which is driven by any suitable means such as the belt drive 12 from a vehicle engine. Pump 10 may be a conventional power steering gear pump. It is provided with a hydraulic fluid reservoir 14. The hydraulic fluid pressure control assembly 16 may be integrally formed to include the brake booster mechanism 18 and the fluid distributors to be described in detail with regard to FIGURE 2. The master cylinder assembly 20 is suitably connected to be activated by the booster 18 as will be described in further detail. As illustrated, the master cylinder assembly 20 is of the tandem pressurizing piston type wherein one piston is capable of pressurizing the front brake wheel cylinders 22 through conduit 24 and another piston is capable of pressurizing the rear brake wheel cylinders 26 through the conduit 28. The brake booster 18 may be controlled by movement of the brake pedal 30 acting through the push rod 32. The system as illustrated in FIGURE 1 also includes the power steering gear valve assembly 34, which is controlled by the operator through the steering wheel 36, and the power steering gear booster assembly 38.

Pump 10 is connected to the assembly 16 by conduit 40. The power steering gear valve assembly 34 is connected to assembly 16 by conduit 42 to receive fluid pressure therefrom and by conduit 44 to return fluid pressure thereto. Hydraulic fluid is exhausted from assembly 16 to the reservoir 14 through conduit 46. The power steering gear valve assembly 34 is also connected to the power steering gear booster assembly 38 by conduits 48 and 50.

Figure 2:
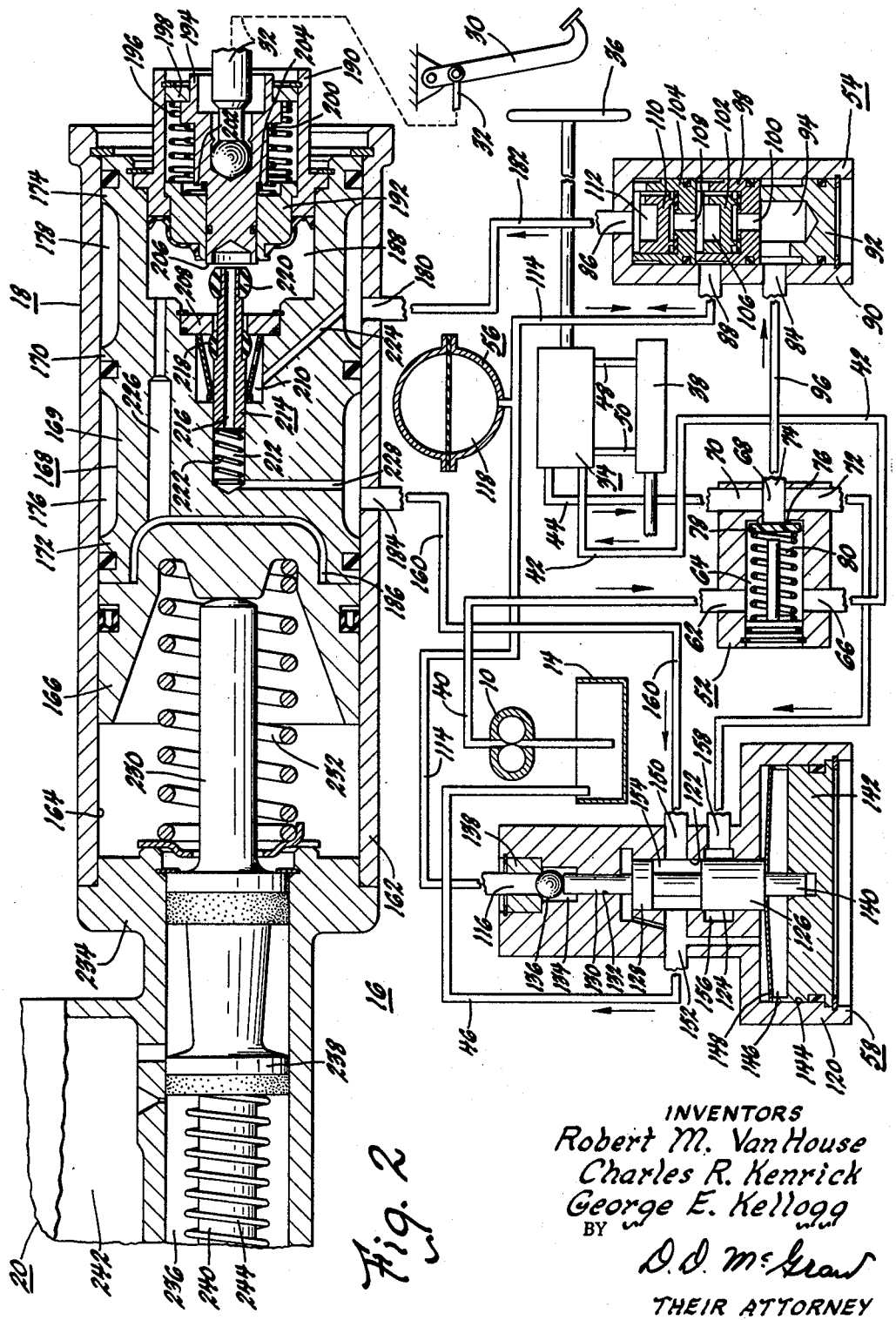
FIGURE 2 is a schematic representation of details of the system of FIGURE 1 showing the cooperative components thereof in cross section with parts broken away, with the components being connected as in FIGURE 1.

Referring now to FIGURE 2, the various elements forming assembly 16 are illustrated schematically as independently housed elements although they are preferably provided in a common housing. The subassembly forming assembly 16 includes a first fluid distributing assembly 52, a second fluid distributing assembly 54, an accumulator 56, a bypass valve assembly 58, and the brake booster assembly 18 which is connected to operate the master cylinder assembly 20. Conduit 40 conducts pressurized hydraulic fluid from pump 10 to the inlet 62 of assembly 52. This assembly is a check valve assembly provided with a chamber 64 to which inlet 62 is connected, and an outlet 66 from chamber 64. Assembly 52 is provided with another chamber 68 having an inlet 70 and outlets 72 and 74 and separated from chamber 64 by an annular valve seat 76. A check valve 78 is positioned in chamber 64 and normally held against seat 76 by spring 80. An orifice may be provided in check valve 78 when the power brake control valve assembly is of the open center type. The assembly outlet 66 is connected through conduit 42 to the power steering gear valve assembly 34 to deliver pressurized fluid thereto. Pressurized fluid from valve assembly 34 is delivered through conduit 44 to inlet 70 of assembly 52.

The second fluid distributing assembly 54 is also a check valve assembly having an inlet 84, an outlet 86, and another outlet 88 which may also under certain operating conditions be an inlet, as will be further described. Assembly 54 is schematically illustrated as including a housing 90 provided with a bore in which a plug 92 is received at one end. The plug inner end defines a chamber 94 to which the inlet 84 is connected. A conduit 96 connects the outlet 74 of assembly 52 with the inlet 84. A first check valve body 98 is positioned in the housing bore and has a passage 100 connecting with chamber 94. A first check valve 102 is reciprocably received within valve body 98 on the opposite side of passage 100 from chamber 94 and cooperates with the valve body 98 and a second check valve body 104 to define a chamber 106. Outlet 88 is connected with chamber 106. Valve body 104 may be identical in shape and size to valve body 98. It therefore has a passage 108 connecting with chamber 106. Normally, when pressurized fluid enters passage 100, check valve 102 is urged toward the second check valve body 104 and permits flow through chamber 106 to passage 108. The upper end of check valve 102 is castellated for this purpose. If, however, the pressure in chamber 106 is greater than the pressure in chamber 94, check valve 102 seats against valve body 98 to prevent flow from chamber 106 to chamber 94.

A second check valve 110, which may be identical to check valve 102, is received in the second check valve body 104 and cooperates with housing 90 to provide an outlet chamber 112 to which outlet passage 86 is connected. Check valve 110 will prevent reverse flow from chamber 112 to chamber 106 while permitting flow from chamber 106 to chamber 112.

Conduit 114 is connected to outlet 88 and to an inlet 116 of bypass valve assembly 58. The hydraulic fluid pressure accumulator 56 is connected to conduit 114 so that its chamber 118 is charged with the pressure in that conduit and, under some conditions will discharge pressurized fluid through that conduit to outlet 88 so that the outlet then acts as an inlet. This occurs when the accumulator is charged and there is insufficient pressure in chamber 94 to keep valve 102 open.

The bypass valve assembly 58 is the subject of patent application Serial No. 291,073, filed June 27, 1963, in the name of Robert M. Van House, and entitled "Belleville Spring Controlled Bypass Valve." The fluid distributing assembly 52 is more particularly disclosed and claimed in patent application Serial No. 291,156, filed June 27, 1963, in the names of Robert L. Gephart and Robert M. Van House, and entitled "Valving for Hydraulic Power Brake System."

The bypass valve assembly 58 is schematically illustrated as including a housing 120 provided with a valve bore 122 in which the bypass valve 124 is reciprocably received. Valve 124 has a center groove to provide lands 126 and 128 which are in valving contact with the wall of bore 122. Valve 124 is provided with an extension 130 which passes through a reduced diameter bore 132 connected to and in alignment with bore 122 and terminating in a chamber 134. A ball valve 136 is received in chamber 134 and is engaged by valve extension 130. An annular ball valve seat 138 is provided in the housing 120. Inlet 116 is connected with the opening formed by seat 138.

Bypass valve 124 is provided with another extension 140 adjacent land 126 which guides the valve in a plug 142 provided in the enlarged bore 144 formed in housing 120 to connect with bore 112 opposite bore 132. Bore 144 and plug 142 define a chamber 146 in which is received a Belleville spring 148 which continuously urges valve 124 away from plug 142. The assembly 58 is also provided with an inlet 150 and an outlet 152 connected with a chamber 154 defined by valve lands 126 and 128 and bore 122. An annular chamber 156 is provided in housing 120 between bore 144 and inlet 150 to which is connected the inlet 158. In the position shown, land 126 closes chamber 156 so that it is not connected with chamber 154. However, by movement of the valve 124 under influence of pressure entering inlet 116, land 126 meters pressurized fluid from chamber 156 to chamber 154 so as to establish an upper limit of hydraulic fluid pressure in chamber 68 of the fluid distributing assembly 52 and ultimately an upper limit of hydraulic fluid pressure which can charge accumulator chamber 118 or be provided to the brake booster mechanism 18. The outlet 152 of assembly 58 is connected through conduit 46 to exhaust fluid pressure to the pump reservoir 14. The inlet 150 of assembly 58 is connected by conduit 160 to receive exhausted hydraulic fluid from the brake booster mechanism 18. Thus the pressure above the predetermined maximum which is delivered from the power steering gear valve assembly 34 is bypassed to exhaust and the hydraulic fluid so bypassed is transmitted to the pump reservoir 14.

The brake booster mechanism 18 is schematically illustrated in FIGURE 2 as having a housing 162 which, as can be seen in FIGURE 1, may be a common housing with the assemblies 52, 54, 56 and 58. Housing 162 is formed to provide a cylinder 164 in which the brake power apply piston 166 is reciprocably received. The valve piston assembly 168 is also reciprocably received in cylinder 164. This assembly is generally formed as a spool 169 provided with a centrally positioned land 170 and end lands 172 and 174. Annular chambers 176 and 178 are, therefore, provided between the lands. A hydraulic fluid pressure inlet 180 in housing 162 connects chamber 178 with outlet passage 86 of the second fluid distributing assembly 54 by a conduit 182. The outlet 184 formed in housing 162 connects chamber 176 with conduit 160 which leads to exhaust through the bypass valve assembly 58. A chamber 186 is provided between brake apply piston 166 and the end of spool 169 on which land 172 is formed. This chamber is pressurized to provide power actuation of the brake apply piston 166. Control of the application of pressure to this chamber is accomplished by a closed center valve arrangement received within the spool 169 and actuated by the vehicle operator by movement of the brake pedal 30 and the push rod 32.

A chamber 188 is formed in the rear end of spool 169 and receives the control valve assembly and the brake reaction assembly. An annular retainer 190 secured in the end of chamber 188 reciprocably receives the reaction piston 192 which in turn reciprocably receives the valve actuating member 194. Push rod 32 is pivotally connected to actuating member 194 for movement of the member in accordance with movement of the brake pedal 30. A compression spring 196 reacts against piston 192 and a ring retainer 198 secured in the rear end of retainer 190 to urge mating shoulders formed on retainer 190 and piston 192 into engagement as illustrated. A second compression spring 200 urges a shoulder formed on valve actuating member 194 into engagement with ring retainer 198 and reacts against piston 192. A shoulder 202 formed by the provision of a forward reduced end of actuating member 194 is axially spaced from reaction piston 192 when the brakes are in the released position, and a rubber snubber 204 is positioned on shoulder 202 so that quiet engagement of that shoulder with piston 192 occurs when reaction is being taken through the shoulder. The forward reduced end of valve actuating member 194 extends through piston 192 in sealing relationship and is provided with a valve seat 206 which forms a part of the booster control valve assembly. The forward end of chamber 188 is provided with a first reduced section in which an annular valve seat 208 is secured, a second further reduced section which forms valve chamber 210, and a third still further reduced section which forms a chamber 212. The valve assembly 214 is formed as a shaft with a central axially extending passage 216 therethrough, with the forward end of the shaft being reciprocably received in chamber 212. A first valve 218 is mounted on the valve shaft so that it normally seats against one side of valve seat 208 in chamber 210, with the valve shaft extending through the annulus of seat 208 with sufficient clearance to provide for pressurized fluid flow around the shaft when the valve is unseated. A second valve 220 is mounted on the rear end of the valve shaft and is positioned in chamber 188 so that the valve is engageable with valve seat 208 upon brake actuation and is spaced from the valve seat when the brakes are released. A spring 222 in chamber 212 urges valve assembly 214 to the right to keep the first valve 218 closed when the brakes are released. A passage 224 connects chamber 178 with chamber 210 to provide pressurized hydraulic fluid to the first valve 218. Another passage 226 extends through spool 169 to connect chamber 188 with chamber 186. Passage 228 connects chamber 212 with chamber 176. It can be seen that in the brake release position, pressurized fluid is provided to chamber 210 while chambers 186 and 188 are at exhaust pressure.

The master cylinder assembly 20 is illustrated as being attached to housing 162 so that the master cylinder actuating rod 230 is engaged by the brake apply piston 166. The apply piston return spring 232 surrounds rod 230 and acts against the master cylinder housing 234 and the piston 166 to normally apply the piston against the end of spool 169. Master cylinder assembly 20 includes the first pressurizing chamber 236 in which the first pressurizing piston 238 reciprocates and acts through the actuating rod 240 to move the second pressurizing piston, not shown. A suitable reservoir 242 for hydraulic brake fluid is provided with appropriate compensation ports for the pressurizing chambers of the master cylinder assembly. The master cylinder actuating rod 230 is maintained in engagement with the brake power apply piston 166 by means of the usual master cylinder pressurizing piston return springs, one such spring 244 being illustrated.

In operation, the pump 10 is running to provide pressurized hydraulic fluid to conduit 40. The pump may be provided with a suitable bypass safety valve as is the custom. Pressurized fluid is contained in chamber 64 of check valve assembly 52, and is conducted through conduit 42 to the power steering gear valve 34. Some of this pressure is utilized as necessary to actuate the power steering gear booster 38. The remainder of the pressure is conducted through conduit 44 to chamber 68 of assembly 52. The amount of pressure is limited by action of the bypass valve assembly 58 which senses the pressure being charged into the accumulator chamber 118 through conduit 96, assembly 54 and conduit 114. This pressure also passes through the first and second check valves of assembly 54 so that it is present in chambers 178 and 210 of the booster assembly 18. If the power stering gear valve 34 should be operated to an extreme left or right turn limit so as to cut off the supply of pressurized fluid to conduit 44, charging of the accumulator 56 is momentarily discontinued. Should the brakes be operated at this time, the first check valve 102 will close passage 100 and the accumulator pressure will be transmitted from accumulator chamber 118 through a portion of conduit 114 to outlet 88 of check valve assembly 54. Thus a sufficient supply of fluid pressure is assured to operate the brakes under such conditions. The fluid pressure supply is similarly available for approximately fifteen brake applications should pump 10 cease to provide sufficient pressure.

When the operator desires to actuate the brakes, he moves brake pedal 30 downwardly to move valve actuating member 194 to the left. This closes valve seat 208 against the second valve 220, thus disconnecting chamber 188 from exhaust passage 216 formed in the valve assembly 214. Further movement of the brake pedal causes the first valve 218 to be disengaged from valve seat 208, and pressurized fluid from chamber 210 flows into chamber 188 and then into brake apply chamber 186 through passage 226. The pressure quickly builds up in chamber 186 and strokes the brake apply piston 166 against the force of spring 232 to actuate the master cylinder assembly 20 and pressurize the front and rear brakes. At the same time pressure in chamber 188 is impressed upon reaction piston 192 until springs 196 and 200 collapse sufficiently to permit snubber 204 and shoulder 202 to effectively engage piston 192. The amount of pressure sufficient to cause engagement of piston 192 with snuber 204 is preferably slightly less than that required to move the vehicle brake shoes into engagement with their associated drums. A very slight amount of reaction is also obtained due to the surface area of valve actuating member 194 exposed to the pressure in chamber 188. After piston 192 operatively engages shoulder 202, the reaction force generated by the pressure in chamber 188 acting on piston 192 and member 194 are transmitted to the operator as brake pedal "feel." When the brakes are applied to the desired extent, pedal 30 is slightly relaxed by the operator so that the first valve 218 seats against seat 208 and the brakes are held applied by the pressure in chamber 186. The brakes are released by releasing the pedal 30 to permit valve actuating member 194 to become disengaged from second valve 220, thereby opening to exhaust the brake apply chamber 186 through passage 226, chamber 188, pasage 216, chamber 112, passage 228, chamber 176, conduit 160, bypass valve assembly 58, and conduit 46.

What is claimed is:
1. A hydraulic power steering and power brake system comprising, a source of hydraulic pressure, a first check valve assembly having first and second chambers separated by a check valve, a power steering gear valve control assembly, a second check valve assembly, a power steering gear booster connected to receive hydraulic pressurized fluid from and to return the same to said valve control assembly, means connecting said hydraulic pressure source to said power steering gear valve control assembly through said first check valve assembly first chamber, means connecting said power steering gear valve control assembly to said first check valve assembly second chamber, means including said second check valve assembly connecting said first check valve assembly second chamber to an accumulator for storage of hydraulic pressure, bypass valve means responsive to pressure in said accumulator for bypassing hydraulic pressure to exhaust from said first check valve assembly second chamber to maintain a predetermined maximum accumulator pressure, a master cylinder assembly for pressurizing a brake, a brake booster including a cylinder with a power piston and a booster control valve assembly and a booster control valve assembly operating rod in alignment with said master cylinder assembly, said booster power piston and booster control valve assembly being received in said cylinder and defining therewith a pressure chamber, means including said second check valve assembly connecting hydraulic pressure selectively from said accumulator and said source of hydraulic pressure to said booster control valve assembly, said control valve assembly being adapted to deliver hydraulic pressure to said power chamber in accordance with operation of said valve operating rod, and means selectively connecting said power chamber to exhaust under control of said booster valve control assembly.

2. A hydraulic booster system for providing booster action to first and second independently operable mechanisms, said system comprising, a source of hydraulic pressure, means connecting said source to said first mechanism and said second mechanism in series, means subject to operation of said first mechanism to interrupt the series connection of said first mechanism with said second mechanism for providing a limited hydraulic pressure connection from said source to said second mechanism, accumulator means operatively connected to said source to accumulate hydraulic pressure, and means selectively connected to receive hydraulic pressure from said source for delivery of the same to said accumulator and said second mechanism in one position of operation and to deliver accumulator pressure to said second mechanism in a second condition of operation.

3. A hydraulic control system for controlling first and second independently operable hydraulic pressure actuated booster mechanisms, said system comprising, a hydraulic pressurizing pump having a hydraulic fluid reservoir, first hydraulic pressure distributing means including first and second chambers separated by a check valve operable to interconnect said chambers upon a predetermined pressure differential, means connecting said pump through said first chamber to said first independently operable booster mechanism, means connecting said second chamber to receive hydraulic pressure from said first booster mechanism, second hydraulic pressure distributing means connected to receive hydraulic pressure from said second chamber of said first distributing means, a hydraulic pressure accumulator, a bypass valve assembly, means connecting said second distributing means to deliver hydraulic pressure to charge said accumulator and to actuate said bypass valve means, means connecting said first distributing means second chamber to said bypass valve means to bypass pressure from said second chamber to the pump reservoir in accordance with pressure charging said accumulator, said second distributing means having another outlet connected to said second booster mechanism and being selectively operable to receive the higher of the hydraulic pressures delivered thereto by said pump and said accumulator for delivery of the higher of said pressures to said second booster mechanism, and exhaust means returning hydraulic fluid from said second booster mechanism to the pump reservoir.

4. In a hydraulic pressure actuated system comprising a first boster and open center booster control assembly, a second booster and booster control assembly, a source of pressurized hydraulic fluid, an accumulator, a pressure regulating bypass valve, and first and second pressurized fluid distributing means, said first distributing means receiving pressurized fluid from said source and delivering same to said first booster and booster control assembly and receiving pressurized fluid from said first booster and booster control assembly and delivering same to said pressure regulating bypass valve and to said second distributing means, said second distributing means delivering pressurized fluid to said accumulator and to said pressure regulating bypass valve to control pressurized fluid delivered to said second distributing means at a predetermined maximum pressure, said second distributing means further delivering pressurized fluid to said second booster and booster control assembly and operable to prevent the delivery of pressurized fluid from said accumulator to said first distributing means through said second distributing means while delivering accumulator pressurized fluid to said second booster and booster control assembly upon failure of said first booster and booster control assembly to deliver pressurized fluid to said first distributing means.

5. The system of claim 4, said first distributing means having an orifice therein for restrictively delivering pressurized fluid from said source to said second distributing means.

References Cited in the file of this patent
UNITED STATES PATENTS

| | | |
|---|---|---|
| 2,809,051 | Jackson | Oct. 8, 1957 |
| 2,896,463 | Rockwell | July 28, 1959 |
| 2,995,382 | Heitzman | Aug. 8, 1961 |
| 3,044,265 | Schwartz et al. | July 17, 1962 |